(12) United States Patent  (10) Patent No.: US 7,841,212 B2
Wang et al.  (45) Date of Patent: Nov. 30, 2010

(54) METHOD OF PROVIDING A SHAPED BODY MADE OF GLASS OR GLASS CERAMICS

(75) Inventors: Hexin Wang, Koenigsbronn (DE); Kurt Becker, Wettenberg (DE); Lutz Autschbach, Oberkochen (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 700 days.

(21) Appl. No.: 11/799,936

(22) Filed: May 2, 2007

(65) Prior Publication Data

US 2007/0258156 A1 Nov. 8, 2007

(30) Foreign Application Priority Data

May 4, 2006 (DE) .................. 10 2006 020 991

(51) Int. Cl.
C03B 23/00 (2006.01)
C03B 23/025 (2006.01)
G01N 23/20 (2006.01)

(52) U.S. Cl. ........................ 65/107; 359/900; 378/70; 65/37; 65/102; 65/106

(58) Field of Classification Search .............. 65/107; 156/99–107; 378/70; 359/900
See application file for complete search history.

(56) References Cited

U.S. PATENT DOCUMENTS 1,996,442 A  4/1935  Stanley
2,865,891 A * 12/1958 Michel .................... 528/301
2,932,129 A *  4/1960 Alexander et al. ............ 65/105
4,059,428 A * 11/1977 Andrews .................... 65/33.1
4,828,598 A *  5/1989 Imamura et al. .............. 65/104
5,066,102 A * 11/1991 Hirano ....................... 359/630
5,448,041 A   9/1995 Benoit et al.
5,545,277 A *  8/1996 Hashemi et al. ............. 156/106
6,776,006 B2 * 8/2004 Best et al. ................... 65/17.4
2008/0099935 A1  5/2008 Egle et al.

FOREIGN PATENT DOCUMENTS

DE     102 59 890 A1     7/2004
FR     1095674 A          6/1955
JP     09227935 A         9/1999
WO     WO 2006050891 A2 *  5/2006

* cited by examiner

*Primary Examiner*—Khanh Nguyen
*Assistant Examiner*—Carson Gross
(74) *Attorney, Agent, or Firm*—Walter A. Hackler

(57) ABSTRACT

A method for producing a shaped body (10) made of glass or glass ceramics comprises the steps of: (a) placing at least two glass blanks (12a, 12b) side by side on a shaped surface (14) of a temperature-resistant sagging mold (13); (b) sagging the glass blanks (12a, 12b) onto the shaped surface (14) by heating the sagging mold (13) and the glass blanks (12a, 12b); (c) attaching the sagged glass blanks (10a, 10b) to each other in order to form the shaped body (10); and (d) lifting the shaped body (10) from the sagging mold (13). A shaped body (10) comprises at least two glass blanks (10a, 10b) attached side by side and formed by sagging.

13 Claims, 5 Drawing Sheets

METHOD OF PROVIDING A SHAPED BODY MADE OF GLASS OR GLASS CERAMICS

The invention relates to a method for producing a shaped body made of glass or glass ceramics, to a shaped body, to field glasses with at least one such shaped body, as well as to an EUV mirror element and X-ray mirror element formed by the shaped body.

A method for producing a shaped body made of glass or glass ceramics is known, for example, from EP 1 391 433 A2. In this printed publication, a blank formed by a glass sheet is first placed on a temperature-resistant sagging mold. Thereafter, said blank is heated up together with the sagging mold, wherein as a result of the influence of gravity the heated blank sags onto the formed surface of the sagging mold and in this way assumes the desired shape. Such sagging methods are used to produce X-ray mirror elements for X-ray telescopes, and lately have also been used to produce EUV mirror elements, as is, for example, described in more detail in the applicant's unpublished PCT/EP2005/011894.

After sagging, the shaped body obtained by sagging can be checked, and if need be reworked in order to rectify any defects of form, as stated in PCT/EP2005/011894. The quality of the shaped bodies produced with the method described above depends on whether the shaped body has a continuous surface or on whether the shape to be produced comprises for example a kink or a step, as can, for example, be the case in a free-form surface. Such surface shapes are associated with a problem in that as a result of sagging, it may not be possible to precisely achieve the desired shape so that it is impossible to achieve reproduction of sufficient dimensional accuracy. If the shaped body is subsequently given a reflective coating, undesirable deformation in the mirror geometry may occur that can be rectified only with corresponding expenditure (rework) or that can no longer be rectified at all.

From DE 103 44 444 A1 a sagging method is known in which a glass blank is to be shaped only in a partial region by gravity sagging. To this effect, in the partial region of the glass blank, which partial region is to be formed, prior to gravity sagging, tapering-off of material is provided, as a result of which the shaping of the glass blank is to be supported.

It is the object of the invention to provide a method of the type mentioned in the introduction, which method makes possible reproduction that is as dimensionally accurate as possible, of any surface shapes, as well as to provide a shaped body, field glasses comprising such a shaped body, and mirror elements formed by the shaped body.

SUMMARY OF THE INVENTION

This object is met by a method comprising the steps of: (a) placing at least two glass blanks side by side on a shaped surface of a temperature-resistant sagging mold; (b) sagging the glass blanks onto the shaped surface by heating the sagging mold and the glass blanks; (c) attaching the sagged glass blanks to each other in order to form the shaped body; and (d) lifting the shaped body from the sagging mold.

In contrast to known sagging methods, in the method according to the invention a shaped body is produced in that two or more blanks are placed on the same sagging mold and are sagged together. After sagging, the blanks are in a precisely defined position relative to each other. Subsequently the blanks are attached to each other such that this relative position can no longer be changed (position fixing). The relative position accuracy is thus determined already in the replication process, i.e. before the shaped body is lifted off the shared sagging mold.

In contrast to this, from prior art (see above) it is only known to place a single blank on a sagging mold, as a result of which, depending on the type of surface to be replicated, it may not be possible to achieve dimensionally accurate replication. While it is also possible to produce the shaped body in that each single blank is sagged onto its own sagging mold, and to subsequently align the sagged blanks in relation to each other, such alignment involves an elaborate installation and adjustment process that does not have to be carried out in the method according to the invention because the position of the dropped blanks relative to each other is fixed directly on the sagging mold.

In the production of a multitude of shaped bodies of identical shape by means of the method according to the invention it is significant that the final position, in which the blanks will be after dropping, can be accurately reproduced. On the one hand this is achieved in that the initial position in which the blanks are placed on the sagging mold is precisely determined, and on the other hand in that the conditions during sagging, i.e. during heating of the blanks, are selected so as to be identical in each case.

In a preferred variant, in step (c) attaching takes place in an integral manner, in particular by pasting together or welding together, at least at some points, at a contact edge at which the sagged glass blanks contact each other at least in parts.

In order to achieve contact between the two sagged blanks at the contact edge, it is for example possible for the edge of one of the blanks to rest against the sagging mold already prior to sagging, i.e. it can already be in the final position, with the edge of the further blank then, as a result of sagging, contacting this edge. As an alternative, it is also possible for two adjacent edges to not yet rest on the sagging mold when the blanks are placed, so that they contact each other at a shared contact edge only after sagging. In this arrangement it is sufficient, for position fixing, if a narrow gap remains between the blanks.

It is decisive for the position of the two sagged blanks relative to each other to be fixed so that said position no longer changes when the shaped body is lifted from the mold. To this effect it is not mandatory for the sagged blanks to be attached to each other along the entire contact edge. However, it must be ensured that the shaped body, after it has been lifted, is not subject to excessive mechanical loads before said shaped body can be attached to a support in order to improve its mechanical stability. An increase in the temperature, and an associated expansion of the shaped body, which increase and expansion occur in the subsequent coating of the shaped body with a reflective coating, can already be taken into account at the time of attaching, e.g. by selecting a suitable adhesive (e.g. epoxy resins, filled or non-filled, for coating temperatures of up to 150° C., or adhesives produced on an inorganic basis for higher coating temperatures) so that position fixing remains, even during coating.

In a preferred variant, attaching takes place by installing at least one connection piece between adjacent edges of the sagged glass blanks. The connection pieces themselves may already cause position fixing; as an alternative, attaching the sagged blanks to each other can also be supported by additional integral connecting, at least in points, at a contact edge.

In a particularly advantageous variant, in step (c) the sagged glass blanks are attached to each other at the rear by means of a fixing structure, in particular made from fibre-reinforced plastic. This rear fastening of the sagged blanks to each other can take place as an alternative or in addition to the above-described integral connection or to the connection pieces, while the shaped body rests against the sagging mold. In this way any tilting of the mirrors in relation to each other can be prevented, which tilting may not be able to be completely prevented in the case of an integral connection alone.

In a further advantageous variant the temperature expansion coefficient of the fixing structure matches the temperature expansion coefficient of the glass blanks. In this way it can be ensured that the relative arrangement of the sagged blanks remains temperature stable even after affixation, which is advantageous as far as the subsequent application of a coating is concerned (see below).

In a particularly preferred variant in a step that follows step (d), in at least one partial region, preferably in two or more partial regions, reflective coatings are applied to the shaped body. As a result of the method according to the invention, in this way multiple mirrors, in particular mirror pairs or trimirrors, can be produced, which are arranged on a shared shaped body that comprises in particular kinks or steps. With the method according to the invention the position tolerance of two or more mirrors in relation to each other can be met without any additional adjustment. As an alternative it is also possible to provide the shaped body with a single reflective coating in a partial region that extends beyond the kink. In this document, the term "partial region" in particular also refers to a complete lateral surface of the shaped body.

In a further variant, which is a particularly preferred variant, the rear of the coated shaped body is attached to a support. In this arrangement the shaped body is preferably pasted to the support, so that high mechanical stability is achieved.

In a further preferred variant, in a step that precedes step (a) the sagging mold is made from a temperature-resistant material, in particular a ceramic material. As far as suitable materials and methods for producing the sagging mold are concerned, reference is made e.g. to EP 1 391 433 A2, which as a result of this reference forms part of the content of this application.

In a particularly advantageous variant the shaped surface of the sagging mold is formed as a free-form profile, a conical profile, a hyperbolic profile or a Wolter profile. Free-form profiles often comprise steps or kinks, while Wolter profiles always comprise a kink. Shaped bodies with the profiles stated above can thus be produced particularly advantageously with the method described in this document. It is also possible to form position reference structures, e.g. cross hairs, on the formed surface, which structures serve as a position reference for adjustment and installation of the shaped body. In this arrangement the optical effect of these structures is negligible.

It is understood that the method described above can in an advantageous manner be supplemented by additional method steps, e.g. in that sagging is supported by the application of positive pressure or negative pressure, or in that reworking of the shaped body takes place before or after coating. In this regard, reference is made to the already mentioned EP 1 391 433 A2 as well as to PCT/EP2005/011894 which as a result of this reference becomes part of the content of this application.

The invention is also implemented in a shaped body which is in particular produced according to the method described above, and which comprises at least two glass blanks fastened to each other and formed by sagging. As a result of the shaped body according to the invention, the problems, as described above, during adjusting are avoided.

The shaped body according to the invention comprises a tolerance for surface form deviation, also referred to as peak-to-valley (PV) difference, of less than 100 µm, preferably less than 30 µm, in particular less than 10 µm. The tolerance for surface form deviation is defined according to ISO 10110-5: 1996-"Optics and optical instruments—Preparation of drawings for optical elements and systems—Part 5: Surface for tolerances", German translation with ref. no. DIN ISO 10110-5:2000-02. As a result of the small tolerance for surface form deviation, two or several individual mirrors can be formed on the shaped body, with the accuracy of the position tolerance of said mirrors in relation to each other being in the micrometer range.

In an advantageous embodiment the shaped body comprises a slope tolerance of less than 5 minutes, preferably less than 0.2 minutes at a slope reference length of 1±0.1 mm. The slope tolerance is defined according to ISO 10110-12: 1997—"Optics and optical instruments—Preparation of drawings for optical elements and systems—Part 12: Aspheric surfaces", German translation with ref. no. DIN ISO 10110-12:2000-02. While the definition according to the above standard refers to aspherical shapes it is also applicable to free-form bodies.

In a further advantageous embodiment the shaped body comprises at least one position reference structure that has been formed during sagging on at least one of the glass blanks.

In a preferred embodiment the shaped body comprises a reflective coating in at least one partial region, preferably in two or more partial regions. As stated above, the shaped body can be made as a single mirror with a kink (e.g. Wolter profile) or as a multiple mirror.

In a further advantageous embodiment the reflective coating has been designed to reflect X-ray radiation or EUV radiation. As a result of sagging it is possible in particular to produce particularly thin mirrors with a Wolter profile, as used for example in X-ray telescopes or in collectors for illumination systems of EUV projection illumination equipment, which also form part of the present invention.

In an alternative embodiment the reflective coating has been designed to reflect light in the visible spectral range. In this case, in particular several individual mirrors that are offset and tilted in relation to each other can be produced with high relative positioning accuracy on a shared shaped body. The invention is thus also implemented in field glasses comprising a plural number of mirrors and comprising at least one shaped body with coatings for reflecting light in the visible spectral range, wherein at least two of the mirrors are formed by partial regions of the shaped body with the reflective coating. By applying at least two reflective coatings to a shared shaped body, their relative positions in relation to each other can be determined precisely in the micrometer range already during the replication process so that adjustment of the mirrors in relation to each other is no longer necessary when they are installed in the field glasses.

Further characteristics and advantages of the invention are provided in the following description of exemplary embodiments of the invention, with reference to the figures of the drawing, which shows details that are significant in the context of the invention, and in the claims. The individual characteristics can be implemented individually by themselves, or several of them can be implemented in any desired combination in a variant of the invention.

BRIEF DESCRIPTION OF THE DRAWINGS

Exemplary embodiments are shown in the diagrammatic drawing and are explained in the following description. The following are shown.

DETAILED DESCRIPTION

Figure 1A:
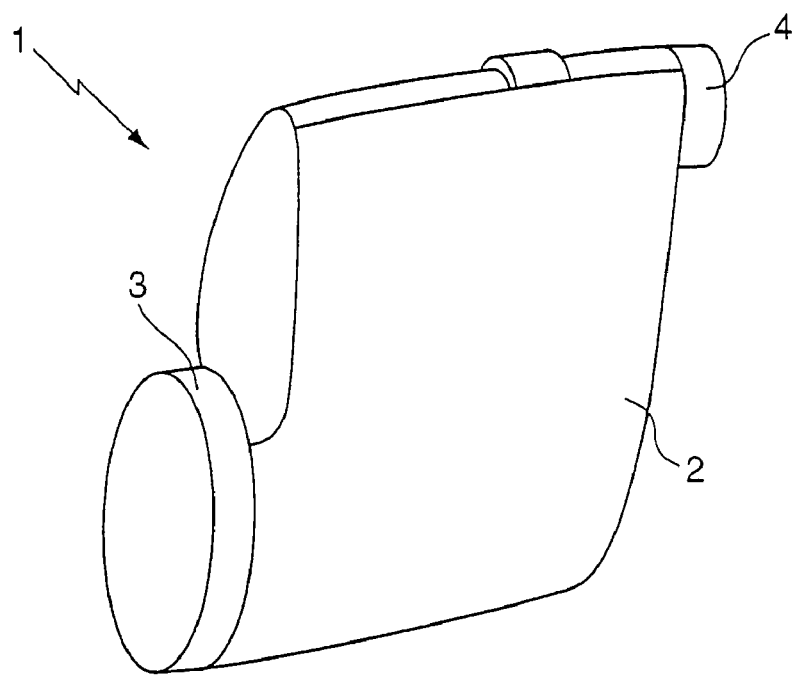
FIG. 1a, b a diagrammatic view of the housing of an embodiment of monocular field glasses according to the invention (FIG. 1a) as well as a beam path in said monocular field glasses, which beam path comprises two opposing pairs of mirrors (FIG. 1b), FIG. 2a, b a view of an embodiment of a shaped body according to the invention with two reflective coatings that form two mirrors of one of the pairs of mirrors of FIG. 1b, in a top view (FIG. 2a) and a lateral view (FIG. 2b), FIG. 3a-d a lateral section of two glass blanks and of a sagging mold to illustrate a variant of the method according to the invention in different method steps, FIG. 4a-c two glass blanks and a sagging mold (FIG. 4a) as well as two sagged glass blanks (FIGS. 4b, c) to illustrate further variants of the method, FIG. 5 a diagrammatic section view of an X-ray telescope with X-ray mirror elements that are formed by shaped bodies according to the invention, and FIG. 6 a diagrammatic lateral section view of an EUV collector for an illumination system of projection illumination apparatus for microlithography, comprising EUV mirror elements that are formed by shaped bodies according to the invention.
Figure 1B:
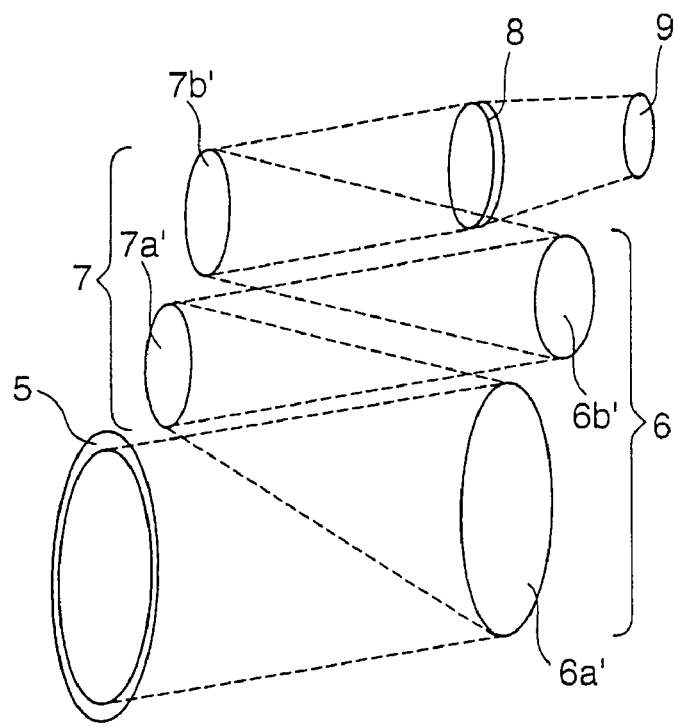

FIG. 1a diagrammatically shows monocular field glasses 1, also referred to as a spotting scope. The field glasses 1 comprise a housing 2 with an eyepiece 4 and a lens 3. The optical design in the interior of the field glasses 1 is diagrammatically shown in FIG. 1b. In an entry aperture 5 the light enters the field glasses 1, impinges a first mirror 6a' of a first pair of mirrors 6 and by it is reflected onto a first mirror 7a' of a second pair of mirrors 7 that is arranged opposite the first pair of mirrors 6. From there the light continues to a second mirror 6b' of the first pair of mirrors 6 from which it is reflected to a second mirror 7b' of the second pair of mirrors 7. Thereafter the light passes through an adjustable internal focussing device 8 before entering an eyepiece adapter 9. For the purpose of simplification, in FIG. 1b the aperture stops that are provided in the beam path are not shown.

Figure 2A:
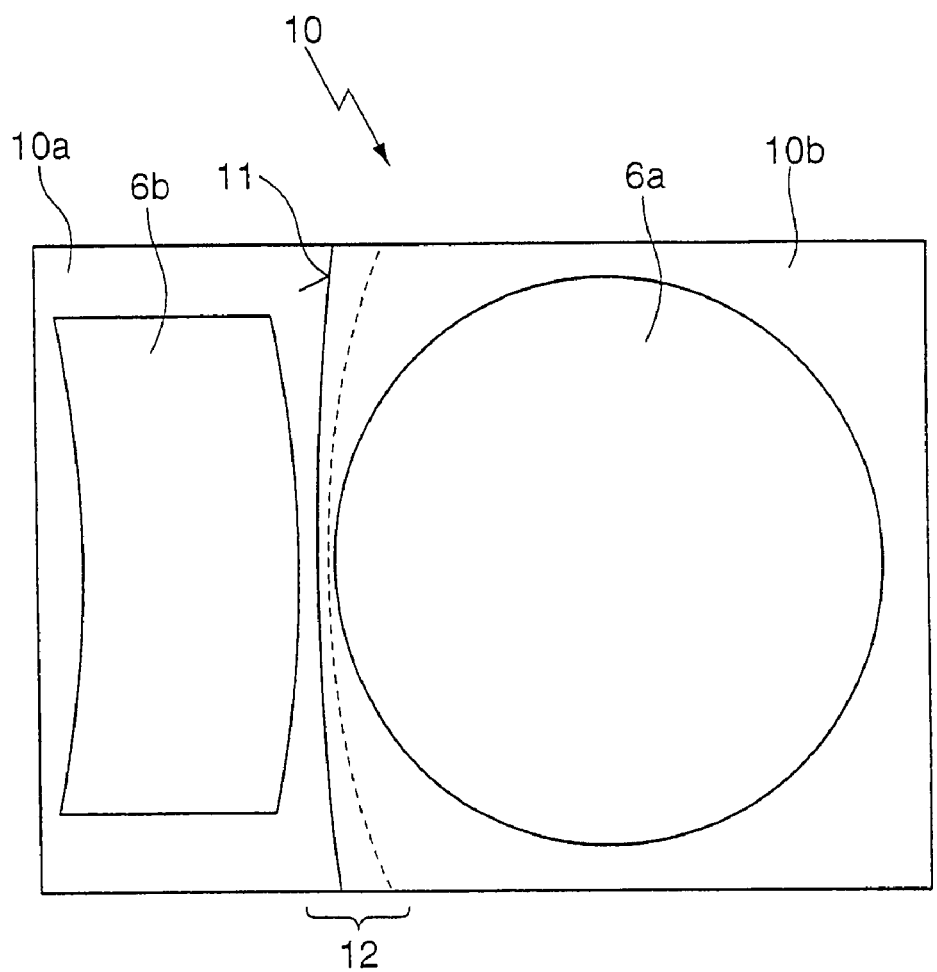
Figure 2B:
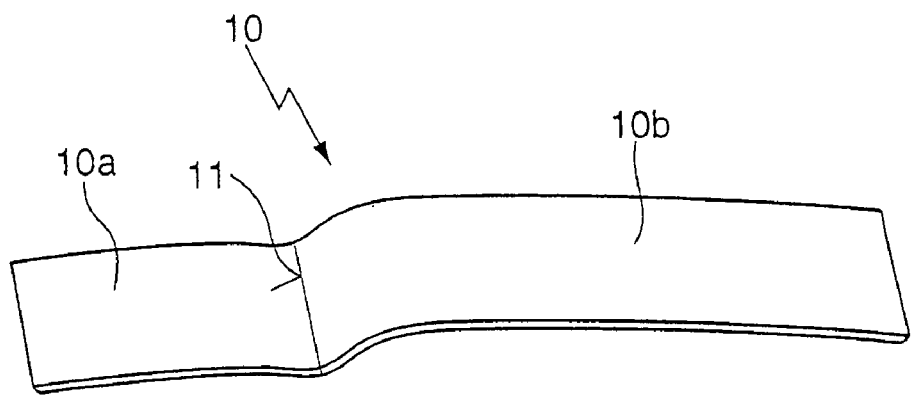

The relative position of the mirrors 6a', 6b' or 7a', 7b' of the pairs of mirrors 6, 7 needs to be precisely matched in the magnitude of micrometers. Up to now this has taken place by placing the mirrors 6a', 6b' or 7a', 7b' in an internal support, with subsequent adjustment relative to each other, which required considerable effort. Fixing the relative arrangement of the mirrors 6a', 6b' e.g. of the first pair of mirrors 6 is achieved as described below, in that reflective coatings are applied in partial regions 6a, 6b to a shared shaped body 10 as shown in FIGS. 2a and 2b, which coatings form the mirrors 6a', 6b'. The relative position of the partial regions 6a, 6b can be very precisely set when the reflective coating is applied. Of course the second pair of mirrors 7 can also be produced in the same manner.

The shaped body 10 must be produced as a free-form surface with little tolerance for surface form deviation of less than 100 μm in order to keep the occurrence of aberrations as a result of deformation of the mirrors 6a', 6b' as low as possible. The greatly different position planes and position angles of the two mirrors 6a', 6b' pose problems in the production of the shaped body 10 with such a tolerance for surface form deviation, e.g. by means of a conventional sagging method. Between the first partial region 6a and the second partial region 6b the above results in a kink 12 in the shaped body 10. This kink 12 prevents the shaped body 10 from being able to be produced by sagging a single glass blank, because in this case the necessary tolerance for surface form deviation would be exceeded.

For this reason the shaped body 10 comprises two glass blanks 10a, 10b, which have been produced by sagging, which blanks 10a, 10b adjoin at a contact edge 11 and at the contact edge 11 are fixed in their position in relation to each other. As a result of this the application of the reflective coatings in the partial regions 6a, 6b can take place jointly, in contrast to the conventional production of pairs of mirrors, where first two individual mirror elements have to be produced and subsequently joined and adjusted.

Figure 3A:
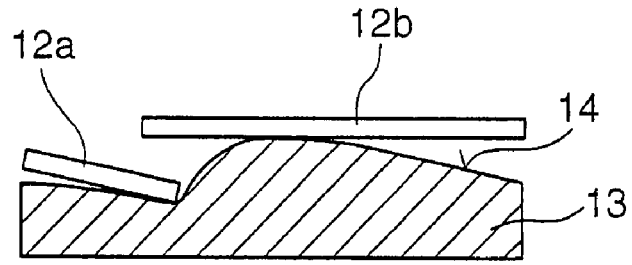
Figure 3B:
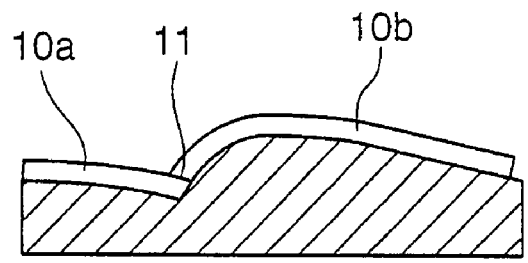
Figure 3C:
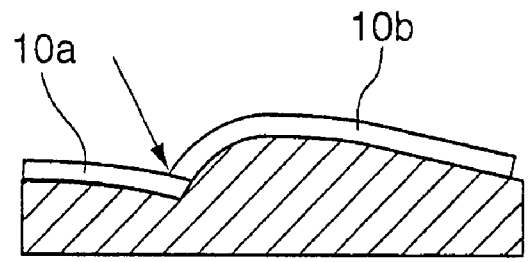
Figure 3D:
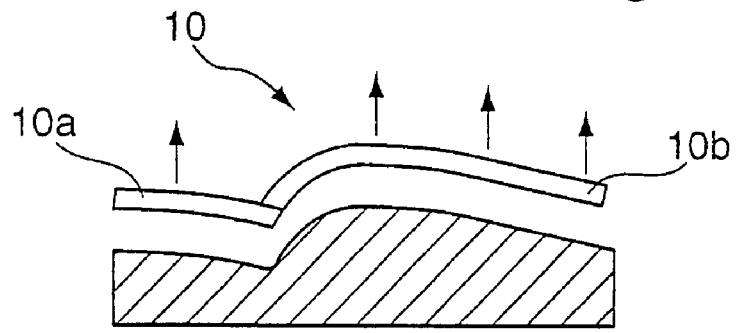

In this arrangement the shaped body 10 is produced in a method whose individual method steps are shown in FIG. 3a-d. As shown in FIG. 3a, first two glass blanks 12a, 12b, which are formed as plane sheets, are placed side-by-side on a shaped surface 14 of a temperature-resistant sagging mold 13. In a subsequent method step the glass blanks 12a, 12b are sagged onto the formed surface 14 by heating the sagging mold 13 with the glass blanks 12a, 12b. As a result of this, the sagged and shaped glass blanks 10a, 10b as shown in FIG. 3b are created from the plane sheets. After sagging, the sagged glass blanks 10a, 10b rest against a shared contact edge 11. There, in a subsequent method step, they are fastened to each other by pasting, which is shown in FIG. 3c by an arrow. In a final method step, shown in FIG. 3d, the formed glass blanks 10a, 10b, which form the shaped body 10, are lifted from the sagging mold 13. In a subsequent method-related step the shaped body 10 formed in this way is provided with a reflective coating in the two partial regions 6a, 6b and is finally pasted onto an internal support (not shown in the illustration) in the housing 2 of the field glasses 1 of FIG. 1a. In this arrangement the shaped body 10 can comprise a position reference structure, e.g. cross hairs, in one or several partial regions, as a result of which structure the adjustment of the shaped body 10 on the support is facilitated.

Figure 4A:
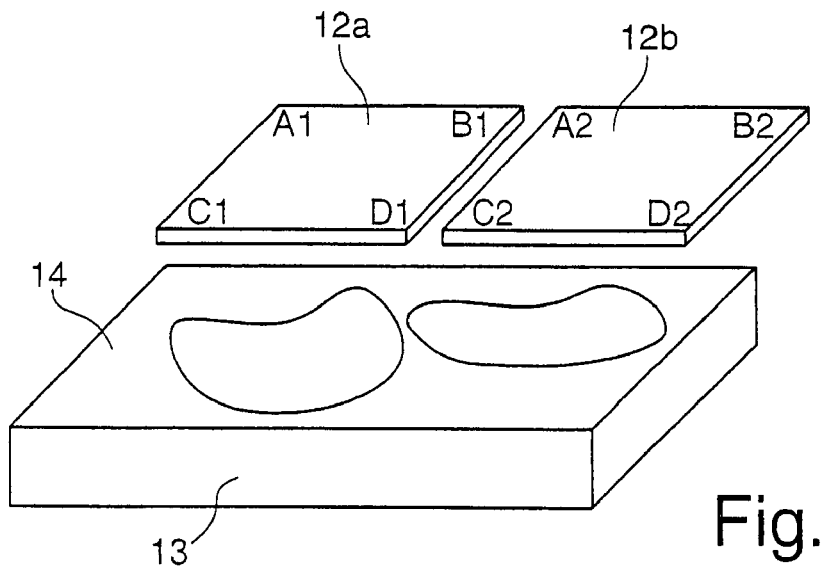
Figure 4B:
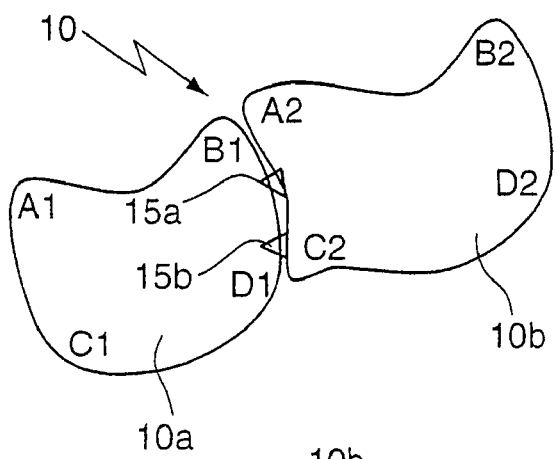
Figure 4C:
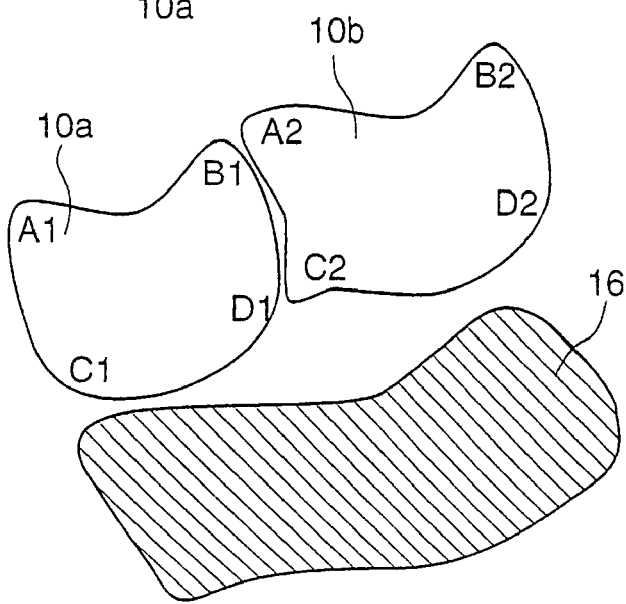

Further variants for producing the shaped body 10 are also possible, as shown for example in FIG. 4a-c with reference to two plane-parallel glass blanks 12a, 12b, whose corners are designated A1, B1, . . . or A2, B2, . . . . The glass blanks 12a, 12b are placed on the sagging mold 13 shown in FIG. 4a, with the shaped surface 14 of said sagging mold differing from the surface shown in FIG. 3 in that the glass blanks 12a, 12b after sagging do not rest against a shared contact edge, as indicated by the non-overlapping regions on the shaped surface 14, which regions show the position of the sagged glass blanks. In this arrangement the sagged glass blanks 10a, 10b, as shown in FIG. 4b, can be fastened to each other by connection pieces 15a, 15b between the adjacent edges B1-D1 and A2-C2, and can be fixed in their positions relative to each other. In addition, an integral connection, e.g. by point pasting in the region of the edges B1-D1 or A2-C2, can take place, in which their distance from each other is small enough for such a connection. As an alternative or in addition, the sagged glass blanks 10a, 10b can be attached to each other on the rear, i.e. on the side opposite the sagging mold 13, over a large area by means of a fixing structure 16 comprising fibre-reinforced plastic, as shown in FIG. 4c. In this arrangement the temperature expansion coefficient of the fixing structure 16 matches the temperature expansion coefficient of the glass blanks 10a, 10b so that position fixing does not change during subsequent coating. Of course in all the variants shown, if required, in a subsequent method step, the shaped body 10 can also be transformed to glass-ceramics by heating.

Figure 5:
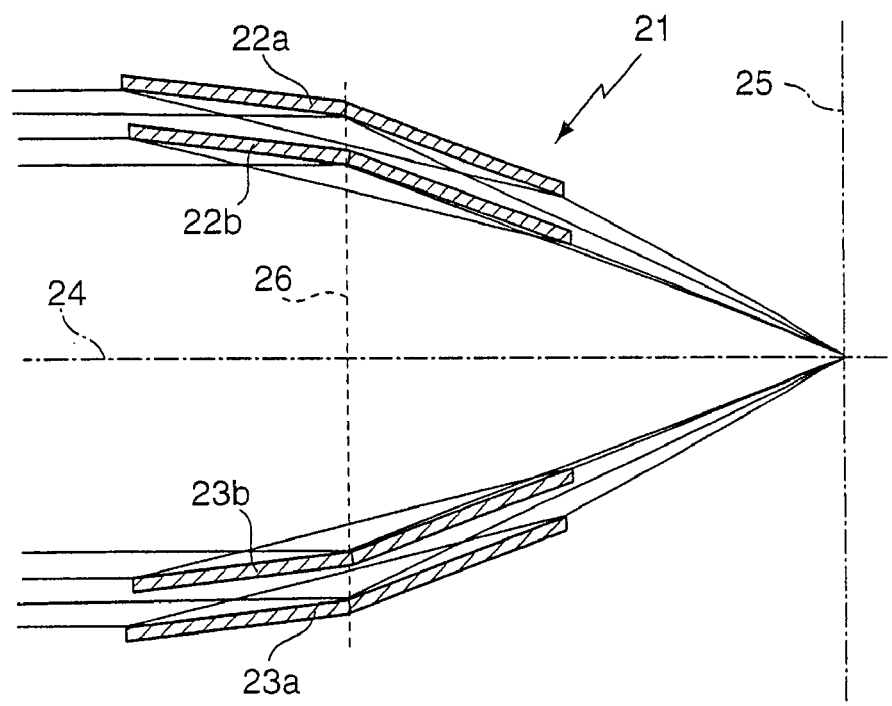
Figure 6:
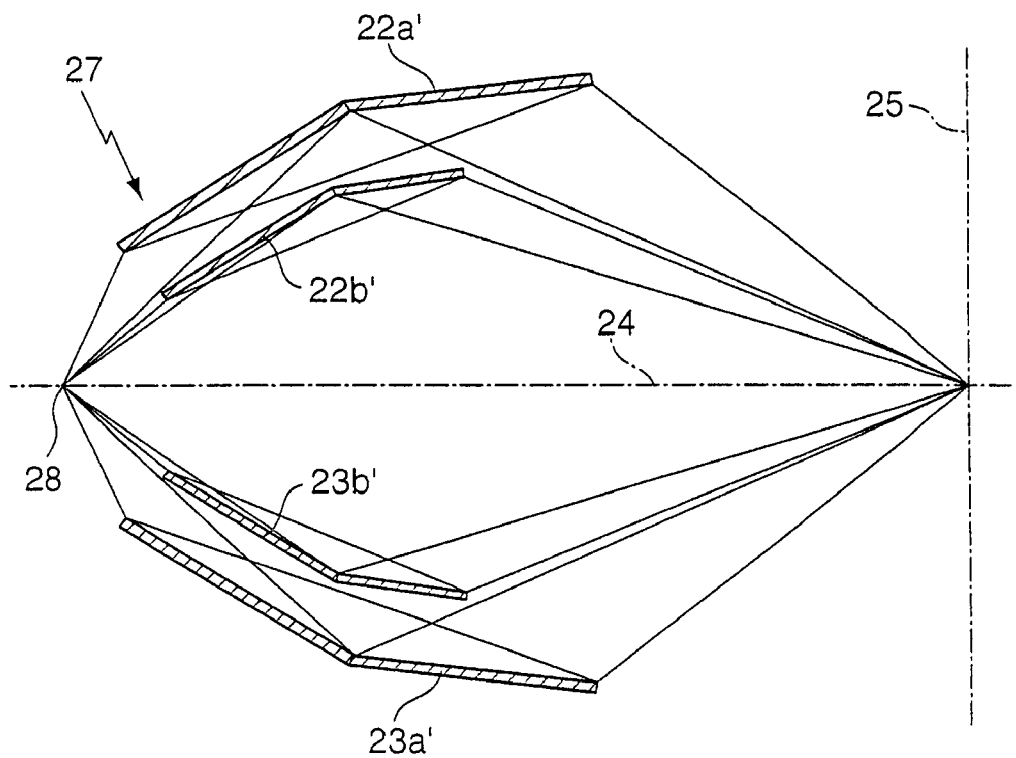

Apart from the application, shown in FIG. 1, of the shaped body 10 in the field glasses 1, which field glasses are designed for light in the visible spectrum, by applying suitable coatings the shaped body can also be used as a reflective element for other spectral ranges, as shown in FIG. 5 in relation to the X-ray spectral range, and in FIG. 6 in relation to the EUV spectral range.

FIG. 5 shows a diagrammatic view of an imaging telescope 21 of Wolter type I, which focuses incident X-ray light to a focusing plane 25 that is arranged at a right angle in relation to an optical axis 24 of the telescope 21. To this effect the telescope 21 comprises a multitude of mirror shells of the Wolter type that are concentrically arranged, are rotationally symmetric, and are nested into each other, which mirror shells are azimuthally segmented. A first and a second mirror element 22a, 23a of a first mirror shell, and a first and a second mirror element 22b, 23b of a second mirror shell, which is arranged further inward, are shown in FIG. 5. The mirror elements 22a to 23b essentially comprise the shaped body 10, which has been produced as described above, and to which on one side a coating that is reflective to X-ray light has been applied. The mirror elements 22a to 23b are operated at grazing incidence, wherein the physical effect of total reflection is used. In the arrangement of FIG. 5 each of the X-ray mirror elements 22a to 23b comprises a first hyperbolic partial region (away from the focusing plane 25) and a second parabolic partial region (towards the focusing plane 25), with said partial regions being separated by a pronounced kink in the mirror segments 22a to 23b, which kink extends in a plane 26 parallel in relation to the focusing plane 25. In the nested configuration of FIG. 5 the thickness of the mirror elements is less than 2 mm. The shaped glass blanks 10a, 10b that form the shaped body 10, from which the X-ray mirrors 22a to 23b are made, are connected to each other at the kink by means of pasting, as shown further above.

FIG. 6 shows a further application for the EUV spectrum, namely an EUV collector 27 which is used in an illumination system of projection illumination apparatus for microlithography so as to concentrate the light emanating from a plasma light source 28 in a focal point in the focal plane 25. The EUV collector 27 comprises a structure that is comparable to that of the telescope 21 of FIG. 5, since said EUV collector 27 comprises a plural number of mirror shells that are concentrically nested into each other, which mirror shells are operated at grazing incidence. Due to the fact that the EUV collector 27 is designed to concentrate EUV radiation instead of hard X-ray radiation, the angles at which the mirror shells are impinged can be selected to be slightly larger. FIG. 6 shows mirror elements 22a' to 23b' that correspond to the mirror elements 22a to 23b and that comprise a first hyperbolic partial region near the light source 28, and a second elliptic partial region near the focal plane 25, which partial regions are separated by a kink in the mirror elements 22a' to 23b'. At the kink, corresponding to FIG. 5, two glass blanks that have been formed by sagging are interconnected by pasting, which glass blanks correspond to the hyperbolically formed or elliptically formed partial region.

The method presented above, or the associated shaped body, makes it possible to produce reflective optical elements with small tolerances for surface form deviation and small slope tolerances, even if said shaped bodies comprise discontinuous regions, e.g. kinks, in that the reflective optical elements are composed of several blanks, wherein already during the replication process the relative position of the formed blanks in relation to each other is fixed, so that a shaped body with a defined geometry is created, which geometry corresponds to the geometry used in the respective optical application.

What is claimed is:
1. A method for producing a shaped body made of glass or glass ceramics, comprising the steps of:
    (a) placing at least two glass blanks side by side at adjacent edges thereof on a shaped surface of a temperature-resistant sagging mold;
    (b) sagging the glass blanks onto the shaped surface by heating the sagging mold and the glass blanks;
    (c) attaching the sagged glass blanks to each other in order to form the shaped body with a tolerance for surface form deviation of less than 100 µm and a slope tolerance of less than 5 minutes at a slope reference length of 1±0.1 mm; and
    (d) lifting the shaped body from the sagging mold.
2. The method according to claim 1, in which in step (c) attaching takes place in an integral manner, by pasting together or welding together, at least at some points, at a contact edge at which the sagged glass blanks contact each other at least in part.
3. The method according to claim 1, in which in step (c) attaching takes place by installing at least one connection piece between adjacent edges of the sagged glass blanks.
4. The method according to claim 1, in which in step (c) the sagged glass blanks are attached to each other at a rear by means of a fixing structure, made from fibre-reinforced plastic.
5. The method according to claim 4, in which the temperature expansion coefficient of the fixing structure is matched with the temperature expansion coefficient of the glass blanks.
6. The method according to claim 1, further comprising applying reflective coatings to the shaped body in at least one partial region following step (d).
7. The method according to claim 6, in which a rear of the coated shaped body is attached to a support.
8. The method according to claim 1 further comprising providing a ceramic sagging mold.
9. The method according to claim 1, further comprising providing the shaped surface of the sagging mold with a profile selected from a group consisting of free-form profile, a conical profile, a hyperbolic profile and a Wolter profile.
10. A method for producing a shaped body made of glass or glass ceramics, comprising the steps of:
    (a) placing at least two glass blanks side by side in an abutting relationship on a shaped surface of a temperature-resistant sagging mold;
    (b) sagging the glass blanks onto the shaped surface by heating the sagging mold and the glass blanks;
    (c) attaching the sagged glass blanks to each other in order to form the shaped body; and
    (d) lifting the shaped body from the sagging mold.
11. The method according to claim 10 wherein the sagged glass blanks are attached to each other in order to form the shaped body with a tolerance for surface form deviation of less than 100 µm and a slope tolerance of less than 5 minutes at a slope reference length of 1±0.1 mm.
12. The method according to claim 1 wherein sagging of the glass blanks produces a kink in the shaped body.
13. The method according to claim 10 wherein sagging of the glass blanks produces a kink in the shaped body.

* * * * *

UNITED STATES PATENT AND TRADEMARK OFFICE
CERTIFICATE OF CORRECTION

| | | |
|---|---|---|
| PATENT NO. | : 7,841,212 B2 | Page 1 of 1 |
| APPLICATION NO. | : 11/799936 | |
| DATED | : November 30, 2010 | |
| INVENTOR(S) | : Hexin Wang, Kurt Becker and Lutz Autschbach | |

It is certified that error appears in the above-identified patent and that said Letters Patent is hereby corrected as shown below:

On the Title Page Item (73) should read

(73) Assignee: Carl Zeiss AG, Oberkochen (DE); Carl Zeiss Sports Optics GmbH, Wetzlar (DE)

Signed and Sealed this
Eighth Day of February, 2011

David J. Kappos
*Director of the United States Patent and Trademark Office*